United States Patent
Kant et al.

(10) Patent No.: US 6,961,208 B2
(45) Date of Patent: Nov. 1, 2005

(54) ACOUSTICALLY IMPROVED DISC DRIVE COVER MADE OF POROUS METAL MATRIX WITH CERAMIC CONSTRAINED WITHIN PORES OF MATRIX

(75) Inventors: Rishi Kant, Boulder, CO (US); Menachem Rafaelof, Superior, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 74 days.

(21) Appl. No.: 10/180,280

(22) Filed: Jun. 26, 2002

(65) Prior Publication Data
US 2003/0179488 A1 Sep. 25, 2003

Related U.S. Application Data
(60) Provisional application No. 60/366,975, filed on Mar. 22, 2002.

(51) Int. Cl.⁷ .................... G11B 33/08; G11B 33/14; G11B 25/04
(52) U.S. Cl. .................... 360/97.02; 360/900
(58) Field of Search ............ 360/97.01, 97.02, 360/97.03, 97.04, 900, 88, 89, 90; 361/684, 685

(56) References Cited

U.S. PATENT DOCUMENTS

| | | |
|---|---|---|
| 5,214,549 A | 5/1993 | Baker et al. |
| 5,483,397 A | 1/1996 | Gifford et al. |
| 5,587,855 A | 12/1996 | Kim |
| 5,712,014 A | 1/1998 | Carden |
| 5,895,696 A | 4/1999 | Stanish et al. |
| 5,948,495 A | 9/1999 | Stanish et al. |
| 5,982,580 A | 11/1999 | Woldemar et al. |
| 6,010,557 A * | 1/2000 | Smoliar et al. ............... 95/116 |
| 6,106,927 A | 8/2000 | Zhong et al. |
| 6,151,198 A | 11/2000 | Prater et al. |
| 6,177,173 B1 | 1/2001 | Nelson |
| 6,243,228 B1 * | 6/2001 | Yoshida et al. .......... 360/97.02 |
| 6,250,364 B1 | 6/2001 | Chung et al. |
| 6,366,426 B1 | 4/2002 | Beatty et al. |
| 6,504,672 B1 * | 1/2003 | Janik et al. ............... 360/97.02 |
| 6,505,839 B1 * | 1/2003 | Nishimuro et al. ......... 277/628 |
| 2001/0028525 A1 | 10/2001 | Lofstrom et al. |
| 2001/0038509 A1 | 11/2001 | Lofstrom et al. |

FOREIGN PATENT DOCUMENTS

JP 05109261 A * 4/1993 ........... G11B/33/14

* cited by examiner

Primary Examiner—Craig A. Renner
(74) Attorney, Agent, or Firm—Fellers, Snider, et al.

(57) ABSTRACT

A top cover formed from a metal matrix composite material for use on a data storage device is disclosed. The metal matrix composite material includes a porous matrix material combined with an inclusion material constrained within the pores of the porous matrix material. The porous matrix material is substantially aluminum while the inclusion material is a ceramic such as silicon hexaboride or aluminum boron carbide capable of wetting molten aluminum. The ceramic inclusion material is selected to have a specific modulus greater than the specific modulus of the porous metal matrix such that the entire volume of porous matrix material provides acoustical dampening during operation of the data storage device.

15 Claims, 2 Drawing Sheets

ACOUSTICALLY IMPROVED DISC DRIVE COVER MADE OF POROUS METAL MATRIX WITH CERAMIC CONSTRAINED WITHIN PORES OF MATRIX

RELATED APPLICATIONS

This application claims priority to U.S. Provisional Application No. 60/366,975 filed Mar. 22, 2002, entitled A Naturally, Acoustically Damped Stiff Cover For Disc Drives.

FIELD OF THE INVENTION

This invention relates generally to the field of magnetic data storage devices, and more particularly, but not by way of limitation, to an acoustically improved top cover for a disc drive.

BACKGROUND

Disc drives are used for data storage in modern electronic products ranging from digital cameras to computers and network systems. Typically, a disc drive includes a mechanical portion and an electronics portion in the form of a printed circuit board assembly that controls functions of the mechanical portion while providing a communication interface to a host being serviced by the disc drive.

Typically, the mechanical portion, or head-disc assembly, has a disc with a recording surface rotated at a constant speed by a spindle motor assembly and an actuator assembly positionably controlled by a closed loop servo system for use in accessing the stored data. The actuator assembly commonly supports a magneto resistive read/write head that writes data to and reads data from the recording surface. Normally, the magneto resistive read/write head uses an inductive element, or writer, to write data to and a magneto resistive element, or reader, to read data from the recording surface.

The disc drive market continues to place pressure on the industry for disc drives with increased capacities, higher data rates, improved adherence to form factor dimensions, heightened acoustical performance and lower costs. A key aspect of achieving lower costs is a reduction in the total part count used in producing the disc drive. Each component eliminated from use affects the material cost, labor cost and cost of overhead applied to the disc drive. Often, overhead cost associated with the procurement, receipt, inspection, and stocking, issuing and controlling material flow a component through manufacturing production operations far outweighs the price paid to a supplier for the component. Additionally, as growth continues in the use of disc drives within portable devices, consistency of compliance with form factor standards and minimum operating acoustics are features of the disc drive rising in importance.

As such, challenges remain and a need persists for effective techniques to reduce the number of components used to produce a disc drive, improve consistency of adherence to form factor standards and minimize operating acoustics of the disc drive. It is to this and other features and advantages set forth herein that embodiments of the present invention are directed.

SUMMARY OF THE INVENTION

As exemplified herein, embodiments of the present invention are directed to a top cover formed from a metal matrix composite material for use on a data storage device is disclosed. The metal matrix composite material includes a porous matrix material, typically formed from a mixture of molten matrix material and a ceramic material. The ceramic material provides an inclusion material constrained within the pores of the porous matrix material. The porous matrix material is substantially aluminum while the inclusion material is a ceramic such as silicon hexaboride or aluminum boron carbide capable of wetting molten aluminum. The ceramic inclusion material is selected to have a specific modulus greater than the specific modulus of the porous metal matrix such that the entire volume of porous matrix material provides acoustical dampening during operation of the data storage device. These and various other features and advantages, which characterize the present invention, will be apparent from a reading of the following detailed description and a review of the associated drawings.

DETAILED DESCRIPTION

Figure 1:
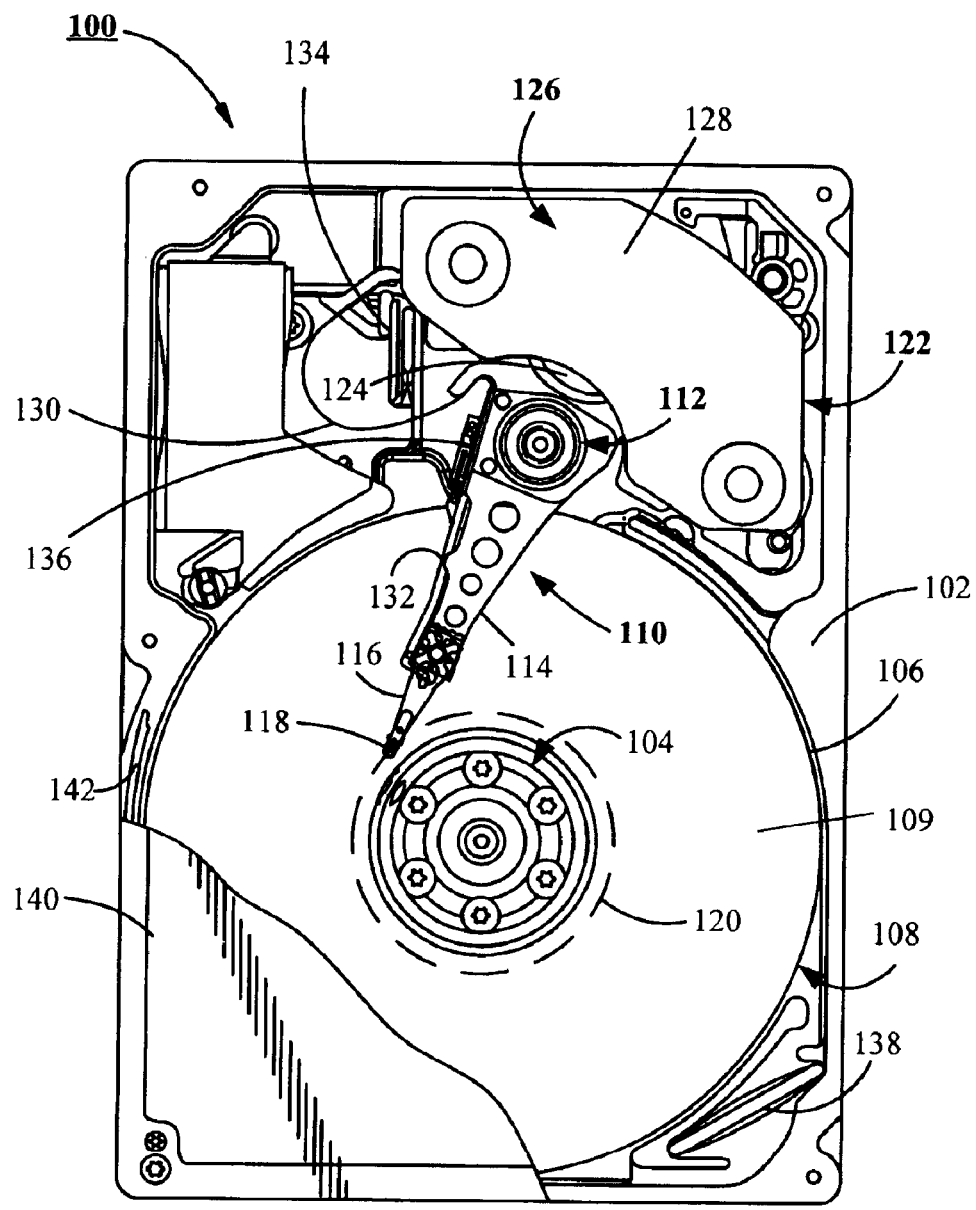
FIG. 1 is a top plan view of a disc drive that incorporates an acoustically improved top cover of the present invention.

Referring to the drawings in general, and more particularly to FIG. 1, shown therein is a top view of a disc drive 100, also referred to herein as a data storage device, constructed in accordance with the present invention. Numerous details of and variations for the construction of the disc drive 100 are not included in the following description as such are well-known to those skilled in the art, and believed unnecessary for the purpose of describing the present invention.

The disc drive 100 includes a basedeck 102 supporting various data storage device components, including a spindle motor assembly 104 that supports one or more axially aligned rotatable discs 106 forming a disc stack assembly 108, each disc 106 having at least one, and usually two, recording surfaces 109.

Adjacent the disc stack assembly 108 is a head stack assembly 110 (also referred to as an actuator assembly) that pivots about a bearing assembly 112 in a rotary fashion. The actuator assembly 110 includes an actuator arm 114 that supports a load arm 116, which in turn supports a read/write head 118 corresponding to the rotatable recording surface 109. The rotatable recording surface 109 is divided into concentric information tracks 120 (only one depicted) over which the read/write head 118 is positionably located. The information tracks 120 accommodate head position control information written to embedded servo sectors (not separately depicted). Between the embedded servo sectors are data sectors used for storing data in the form of bit patterns. The read/write head 118 includes a reader element (not separately shown) offset radially and laterally from a writer element (not separately shown). The writer element writes data to the concentric information tracks 120 while the reader element controls the positioning of the read/write head 118 relative to the concentric information tracks 120 during write operations. During read operations the reader element reads data from the concentric information tracks 120 for passage to a host (not shown) serviced by the disc drive 100 and for use by a servo control system.

The term "servoing" or "position-controlling," as used herein, means maintaining control of the read/write head 118 relative to the rotating recording surface 109 during operation of the disc drive 100. When servoing to or servoing on a selected information track 120, the actuator assembly 110 is controllably positioned by a voice coil motor assembly 122. The voice coil motor assembly 122 includes an actuator coil 124 immersed in a magnetic field generated by a magnet assembly 126. A pair of steel plates 128 (pole pieces) mounted above and below the actuator coil 124 provides a magnetically permeable flux path for a magnetic circuit of the voice coil motor 122. During operation of the disc drive 100, current passes through the actuator coil 124 forming an electromagnetic field, which interacts with the magnetic circuit of the voice coil motor 122, causing the actuator coil 124 to move relative to the magnet assembly 126. As the actuator coil 124 moves, the actuator assembly 110 pivots about the bearing assembly 112, causing the read/write head 118 to move over the rotatable recording surface 109, thereby allowing the read/write head 118 to interact with the information tracks 120 of the recording surface 109.

To provide the requisite electrical conduction paths between the read/write head 118 and read/write circuitry of the disc drive (not shown), read/write head wires (not shown) affixed to the read/write head 118 are attached to a read/write flex circuit 130. The read/write flex circuit 130 is routed from the load arm 116 along the actuator arm 114 and into a flex circuit containment channel 132 and secured to a flex connector body 134. The flex connector body 134 supports the flex circuit 130 during passage through the basedeck 102 and into electrical communication with a printed circuit board assembly (PCBA) (not shown) typically mounted to the underside of the basedeck 102.

The flex circuit containment channel 132 also supports read/write signal circuitry including a preamplifier/driver (preamp) 136 used to condition read/write signals passed between the read/write circuitry and the read/write head 118. The printed circuit board assembly provides the data storage device read/write circuitry that controls the operation of the read/write head 118, as well as other interface and control circuitry for the disc drive 100.

To assure a continually clean interior operating environment, a hepa filter 138 is provided to extract particles from the interior operating environment while the disc drive 100 is in an operating mode. To preclude migration of particles into the interior operating environment, a top cover 140 compresses a gasket 142 against the basedeck 102 to form a hermetic seal between the interior environment of the disc drive 100 and the environment exterior to the disc drive 100.

The demand placed on the disc drive industry by the recently emerging portable electronic device market is for a quiet operating, lightweight disc drive 100 that adheres to form factor standards. This product requirements matrix has brought forth several challenges. From an acoustical and weight perspective, a challenge is to provide a simple, lightweight, acoustically improved top cover 140. This invention disclosure addresses the above-mentioned issue.

Figure 2:
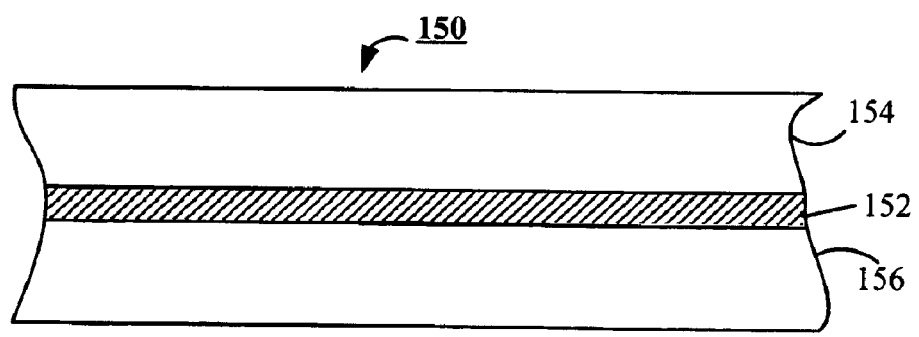
FIG. 2 is a partial cross sectional elevational view of a prior art top cover incorporating a constrained layer dampening member.

Audible vibrations dispersed by the disc drive 100, that reach human ears, are chiefly caused by the so-called drumming mode of the cover. Typical techniques used to dampen these vibrations include the use of silicone or urethane isolators or an incorporation of constrained layer dampening. FIG. 2 shows a construction of a prior art top cover 150 that incorporates the constrained layer dampening technique to dampen vibration transmission of the prior art top cover 150.

The constrained layer dampening construction of the prior art top cover 150 includes a thin layer of viscoelastic, adhesive material 152 placed between a top metallic member 154 and a bottom metallic 156. The metallic members 154 and 156 are typically formed from an aluminum alloy. The thin layer of viscoelastic, adhesive material 152 allows shear between the top metallic member 154 and the bottom metallic member 156. Therefore, the shear portion of the acoustic energy is quickly dissipated in shear constraints. This method of acoustic vibration mitigation is fairly common. However, implementation necessitates two layers of metal and one layer of dampening material and places constraints on conformance to established form factor standards. Moreover, the dampening in the top cover 140 is limited to an area where the constrained layer is operative, discussed further below.

Figure 3:
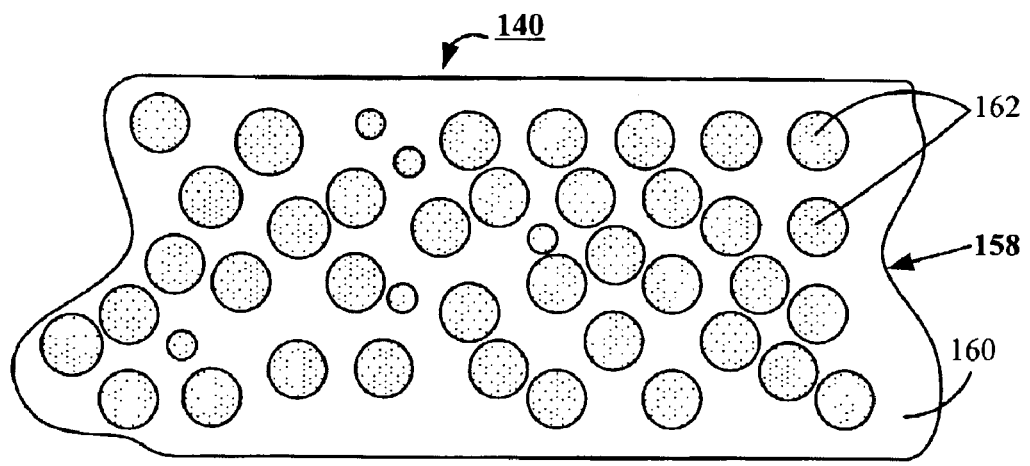
FIG. 3 is a partial cross sectional elevational view of a top cover of the disc drive of FIG. 1, which incorporates a metal matrix composite rather than the constrained layer dampening member of FIG. 2 for suppression of acoustical noise.

FIG. 3 shows a metal matrix composite (MMC) 158 used to form the top cover 140. Properties of the MMC 158 serve to dampen acoustic vibrations while providing sufficient stiffness to the top cover 140 to promote compression of the gasket 142 (of FIG. 1) between the top cover 140 and the basedeck 104 (of FIG. 1).

In a preferred embodiment, the metal matrix composite 158 is formed from two components: a matrix material 160, typically a lightweight metal, and an inclusion material 162, the choice of which depends on the desired performance properties for the metal matrix composite 158. In a preferred embodiment aluminum is selected for the matrix material 160. Acoustically, absence of the inclusion material 162 from the matrix material 160 is ideal. However, the result of a top cover 140 formed the matrix material 160 only, yields a compliant top cover 140 incapable of supporting a load needed for compression of the gasket 142, that is absent deformation of the top cover 140. While in prior art, the dampening is typically limited to a predetermined region where the constrained layer is provided. In the present invention, dampening occurs over the entire top cover 140 thus increasing the damping efficiency several folds.

The next most acoustically desirable configuration for the metal matrix composite 158 formed top cover 140 is selection of inclusion material 162 with a higher specific modulus than the specific modulus of the material used to form the matrix material 160. In selecting the inclusion material 162 with a higher specific modulus, the resulting top cover 140 will display a specific modulus higher than a specific modulus displayed by a top cover substantially dimensionally similar to top cover 140, but formed from the material used to form the matrix material 160. It is a rule of the nature that, the higher the specific modulus of a component, the higher the resonate frequency of the component.

In a preferred embodiment, the inclusion material 162 is silicon hexaboride. A desirable property of silicon hexaboride is that its density is equal to that of aluminum and it forms a stable solution with molten aluminum. Additionally, because the density of silicone hexaboride is equal to the density of aluminum, the top cover 140 can be "tuned" to meet the acoustical demand of each disc drive 100 configuration by varying the ratio of inclusion material 162 to metal matrix material 160, while maintaining a constant mass.

The choice of inclusion is not limited to silicone hexaboride. The inclusion can be any from the family of ceramics that wet molten aluminum. An example of this inclusion is aluminum boron carbide. Like silicon hexaboride, aluminum boron carbide, when used as an inclusion, also forms a stable solution with aluminum matrix since aluminum boron carbide wets molten aluminum, i.e., leaves a continuous permanent film on the aluminum.

For a finely ground inclusion material 162 (composite spheres model), the modulus of elasticity, and the shear modulus for the metal matrix composite 158 formed top cover 140 are governed by the following formula:

$$E = \frac{9k\mu}{3k + \mu} \quad \text{Equation (1)}$$

$$\frac{\mu}{\mu_m} = 1 - \frac{15(1 - v_m)[1 - (\mu_i/\mu_m)]c}{7 - 5v_m + 2(4 - 5v_m)}$$

$$k = k_m + \frac{c(k_i - k_m)}{1 + (1-c)[(k_i - k_m)/(k_m + \frac{4}{3}\mu_m)]}$$

Where the indices (i) refers to the inclusion material 162 and (m) refers to the matrix material 160. The variable, c, refers to the volume concentration of the inclusion in the composite where $c=v_i/v_m$, $v=v_i+v_m$. It is readily observed that for given $k_i$, $k_m$, $\mu_i$, and $\mu_m$ (matrix material 160 and inclusion material 162 properties), varying mechanical properties for the metal matrix composite 158 formed top cover 140 can be produced by varying the concentration of the inclusion material 162 in the metal matrix composite 158.

It is further observed that if the inclusion material 162 has higher shear modulus than the shear modulus for the material used to form the matrix material 160, then the shear modulus for the metal matrix composite 158 will be higher than the shear modulus for the material used to form the matrix material 160 alone. Further, if the density of the inclusion material 162 and the matrix material 160 are the same, as is the case with aluminum and the silicon hexaboride, the density of the metal matrix composite 158 will also be the same as the matrix material alone. Therefore, a metal matrix composite 158 of aluminum and silicon hexaboride has higher shear modulus (hence a higher modulus of elasticity) while possessing the same density as that of aluminum.

With c=0.40, the resulting modulus of elasticity of the metal matrix composite 158 is approximately 24.5 mpsi. Thus, when compared with aluminum, the resulting metal matrix composite 158 provides high stiffness absent additional mass. The specific modulus of this metal matrix composite 158 is up to 3 times higher than that of stainless steel. This is advantageous in terms of dynamics for the top cover 140 because each top cover 140 formed from the metal matrix composite 158 weighs substantially the same as a prior art top cover of comparable dimensions formed from aluminum yet possess resonance frequencies that are up to 1.6 times higher than resonance frequencies in parts made with steel.

Because the inclusion material 162 of the metal matrix composite 158 of the top cover 140 is uniformly dispersed throughout the matrix material 160 and because of the hardness of the inclusion material 162, the entire volume of the more compliant surrounding matrix material 160 behaves like a "constrained layer." Therefore more energy is dissipated in the matrix material and the vibrations are quickly dampened. It has been experimentally verified that viscous dampening in metal matrix composite 158 of silicon hexaboride is substantially 4.5 time better than in aluminum.

Figure 4:
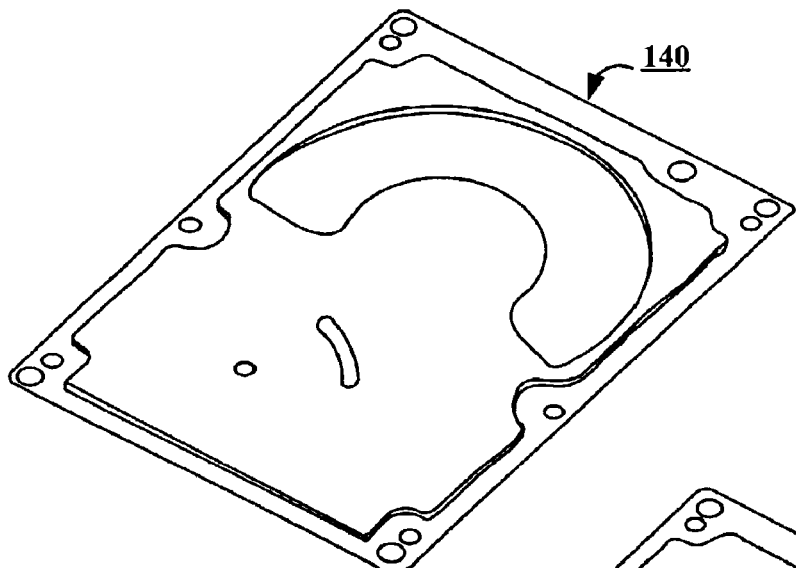
FIG. 4 is a perspective view of the top cover of the disc drive of FIG. 1.
Figure 5:
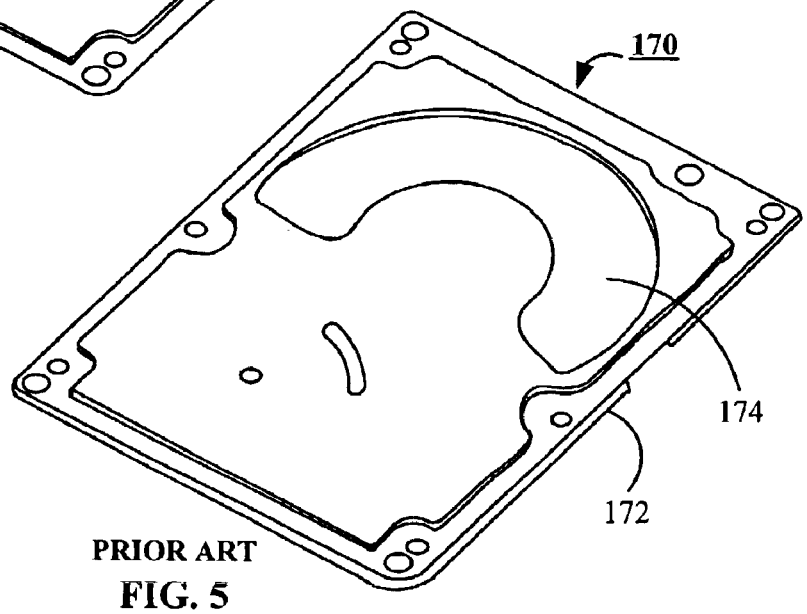
FIG. 5 is a perspective view of a prior art top cover that incorporates the constrained layer dampening member of FIG. 2.

FIG. 4 shows the metal matrix composite 158 formed top cover 140, while FIG. 5 shows prior art top cover 170 formed from aluminum. It is noted that the prior art top cover 170 includes a skirt 172 for added rigidity and a crescent shaped region 174. The crescent shaped region 174 is the only region of the top cover 170 that dampening occurs. Further, absent the skirt 172, each top cover 140 remains within the envelope of the form factor of +/-0.005 inches whereas the prior art top cover violates this requirement.

In a preferred embodiment, a top cover (such as 140) is formed from a metal matrix composite (such as 158). The metal matrix composite material includes a porous matrix material (such as 160) combined with an inclusion material (such as 162) constrained within the pores of the porous matrix material. The porous matrix material is substantially aluminum while the inclusion material is a ceramic such as silicon hexaboride or aluminum boron carbide capable of wetting molten aluminum. The ceramic inclusion material is selected to have a specific modulus greater than the specific modulus of the porous metal matrix such that the entire volume of porous matrix material provides acoustical dampening during operation of the data storage device.

Accordingly, embodiments of the present invention are directed to a disc drive (such as 100) that includes a basedeck (such as 102) supporting a disc stack assembly (such as 108), an actuator assembly (such as 110) adjacent the disc stack assembly while being supported by the basedeck, and a top cover (such as 140) secured to the basedeck compressing a gasket (such as 142) against the basedeck to form a hermetically sealed enclosure enclosing the disc stack assembly and the actuator assembly while dampening operating acoustical noise by virtue of the top cover being formed from a metal matrix composite (such as 158). The metal matrix composite is formed from a porous metal matrix (such as 160) and an inclusion material (such as 162) constrained within the pores of the porous metal matrix.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the appended claims.

What is claimed is:

1. A data storage device housing enclosure comprising:
   a porous metal matrix; and
   an inclusion material constrained within pores of the porous metal matrix.

2. The enclosure of claim 1, wherein the enclosure comprises a base deck and a top cover which cooperate to complete the enclosure, and wherein the top cover is formed of said porous metal matrix and said inclusion material.

3. The enclosure of claim 1, in which the porous metal matrix is formed from aluminum.

4. The enclosure of claim 1, in which the inclusion material is a ceramic material capable of wetting molten aluminum.

5. The enclosure of claim 1, in which the porous metal matrix and the inclusion material are configured to selectively dampen acoustical noise generated during operation of a moveable data access component within the enclosure.

6. The enclosure of claim 4, in which the ceramic material is silicon hexaboride.

7. The enclosure of claim 4, in which the ceramic material is aluminum boron carbide.

8. A data storage device comprising an enclosure housing comprising a porous metal matrix and an inclusion material constrained within pores of said matrix.

9. The data storage device of claim 8, further comprising a moveable data access component supported within the enclosure housing, wherein the porous metal matrix and the inclusion material are configured to selectively dampen acoustical noise generated during operation of said component.

10. The data storage device of claim 8, in which the porous metal matrix is formed from aluminum.

11. The data storage device of claim 8, in which the inclusion material is a ceramic material capable of wetting molten aluminum.

12. The data storage device of claim 8, wherein the enclosure housing comprises a top cover affixable to a base deck to complete the housing enclosure, and wherein the top cover is formed of said porous metal matrix and said inclusion material.

13. The data storage device of claim 11, in which the ceramic material is silicon hexaboride.

14. The data storage device of claim 11, in which the ceramic material is aluminum boron carbide.

15. A data storage device comprising a moveable data access component housed within a housing enclosure, the housing enclosure comprising means for dampening acoustical noise generated by operation of said component.

* * * * *